(12) United States Patent
Wolff et al.

(10) Patent No.: US 6,716,781 B2
(45) Date of Patent: Apr. 6, 2004

(54) LEAD-FREE OPTICAL GLASSES

(75) Inventors: Silke Wolff, Hueckeswagen (DE); Peter Brix, Mainz (DE); Ute Woelfel, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/191,195

(22) Filed: Jul. 9, 2002

(65) Prior Publication Data

US 2003/0040424 A1 Feb. 27, 2003

(30) Foreign Application Priority Data

Jul. 10, 2001 (DE) .......................... 101 33 521

(51) Int. Cl.$^7$ .......................... C03C 3/083; C03C 3/112
(52) U.S. Cl. .......................... 501/68; 501/57; 501/903
(58) Field of Search .......................... 501/57, 63, 68, 501/903

(56) References Cited

U.S. PATENT DOCUMENTS

| | | | |
|---|---|---|---|
| 3,940,278 A | | 2/1976 | Wolf |
| 3,969,121 A | * | 7/1976 | Atkinson ..................... 501/38 |
| 4,212,919 A | * | 7/1980 | Hoda ......................... 428/410 |
| 4,367,012 A | * | 1/1983 | Ikeda et al. ................. 385/144 |
| 4,565,791 A | * | 1/1986 | Boudot et al. ................ 501/56 |
| 5,320,985 A | * | 6/1994 | Enomoto ...................... 501/57 |

FOREIGN PATENT DOCUMENTS

| | | |
|---|---|---|
| DE | 196 09 735 A1 | 9/1997 |
| EP | 0 945 349 A2 | 9/1999 |
| JP | 59078949 A * | 5/1984 ............. C03C/3/04 |

OTHER PUBLICATIONS

Derwent Abstract 1984–149644 of Japanese Patent Publication 59-78949.*
PArtial English translation of Japanese Patent Publication 59-78949.*

* cited by examiner

*Primary Examiner*—David Sample
*Assistant Examiner*—Elizabeth A. Bolden
(74) *Attorney, Agent, or Firm*—Michael J. Striker

(57) ABSTRACT

The lead-free optical glasses have an index of refraction ($n_d$) between 1.49 and 1.55 and an Abbé number ($v_d$) between 47 and 59. They contain (in percent by weight on an oxide basis) 60 to 70, $SiO_2$; 0.3 to 5, $Al_2O_3$; 16 to 25, $Na_2O$; 0 to 9, $TiO_2$; 0 to 7, advantageously 0.1 to 2, $ZrO_2$; 0 to <0.5, $Nb_2O_5$; 0 to 7, $Ta_2O_5$ and 0 to 3, F. The lead-free optical glass is advantageously free of arsenic oxide, except for impurities, and contains antimony oxide as a fining agent.

11 Claims, No Drawings

LEAD-FREE OPTICAL GLASSES

BACKGROUND OF THE INVENTION

1. Field of the Invention

The present invention relates to lead-free optical glasses with indices of refraction $n_d$ between 1.49 and 1.55 and with Abbénumbers $v_d$ between 47 and 59.

2. Description of the Related Art

Since the glass components PbO and $As_2O_3$ have entered public discussion as being environmental pollutants, the manufacturers of optical instruments demand PbO-free and preferably also $As_2O_3$-free glasses having appropriate optical properties.

Simple replacement of the lead oxide by one or more ingredients is generally not a successful way of reproducing the desired optical and glass performance properties affected by PhO. Instead, new developments or substantial modifications to the glass composition are necessary.

Lead-free optical glasses having optical values in the above range and similar compositions are already known. However these glasses have various disadvantages.

DE 196 09 735 A1 describes crown flint glasses which have a high $SiO_2$ content and therefore are relatively difficult to melt and have high melting temperatures.

U.S. Pat. No. 3,940,278 describes a glass for optical glass fibers. Although its rather low $SiO_2$ content and rather high $Al_2O_3$ content are a way to achieve the desired flow behavior at high temperatures and, chemical resistance, it is necessary to use very large amounts of $Na_2O$ and BaO in the glass. Because of these high levels of $Na_2O$ and BaO, these glasses become very susceptible to crystallization.

EP 0 645 349 A1 describes an optical glass consisting of the system $SiO_2$—$Nb_2O_5$—$R_2O$—F and further optional components. Because of its $Nb_2O_5$ level of up to 15% by weight, the glass is very susceptible to crystallization.

SUMMARY OF THE INVENTION

It is an object of the present invention to provide a lead-free optical glass having a refractive index $n_d$ between 1.49 and 1.55 and an Abbé number $v_d$ between 47 and 59, which is inexpensive to produce, has good melting and processing properties and sufficient crystallization stability.

According to the invention the lead-free optical glass has an index of refraction ($n_d$) between 1.49 and 1.55 and an Abbé number ($v_d$) between 47 and 59, and comprises (in percent by weight on an oxide basis):

| | |
|---|---|
| $SiO_2$ | 60 to 70 |
| $Al_2O_3$ | 0.3 to 5 |
| $Na_2O$ | 16 to 25 |
| $TiO_2$ | 0 to 9 |
| $ZrO_2$ | 0 to 7 |
| $Nb_2O_5$ | 0 to <0.5 |
| $Ta_2O_5$ | 0 to 7 |
| F | 0 to 3 | and optionally at least one fining agent in an amount sufficient for fining.

The glasses contain the glass-forming oxides $SiO_2$ (60–70 percent by weight) and $Al_2O_3$ (0.3 to 5 percent by weight), $SiO_2$ being the main glass former. Preference is given to a minimum $SiO_2$ content of >60 percent by weight. If the above-mentioned maximum $Al_2O_3$ content were exceeded, the devitrification tendency and the melting temperature would increase excessively. Preference is given to a maximum $Al_2O_3$ content of <5% by weight. On the other hand, omission of this second glass former would lead to a reduction in chemical resistance. In total, the high glass former level of at least 60.3%, by weight and up to 75% by weight results in a relatively high viscosity.

This is counteracted by the high level of $Na_2O$ (16–25 percent by weight) which acts as fluxing agent for improving the meltability. In addition, the glass formers, in this ratio to the fluxing agent $Na_2O$, have a beneficial influence on the glass "length" so that these glasses are easy to process. At even higher levels, in particular in the presence of $TiO_2$ and $ZrO_2$, the crystallization tendency would be increased excessively. For the same reason, $Li_2O$ is completely omitted.

The glasses can contain both $TiO_2$ (up to 9 percent by weight) and $ZrO_2$ (up to 7 percent by weight). These two components improve the chemical resistance, but do not reduce the meltability as much as $Al_2O_3$. At higher levels, the crystallization stability would be substantially reduced, as with $Al_2O_3$. In addition, higher $TiO_2$ levels, together with the iron ion impurities in the glass, promote yellow discoloration of the glasses by formation of ilmenite.

The crystallization tendency is counteracted by the addition of both components, because in this case the potential pure crystal structure is disturbed, and therefore it is possible to incorporate higher total levels of both components than of a single component. In this way, it is also possible to counteract ilmenite formation and thus discoloration of the glasses. For these reasons, compositions, which contain both ingredients, are preferred in terms of crystallization stability.

Both components are also used in order to achieve the desired refractive index and dispersion range. Both components make it possible to establish a high refractive index at the same time as a low Abbé number. Here, it is likewise preferred to use both components in order to facilitate establishing a specific optical status by variation.

For this reason, the glasses according to the invention can additionally contain up to 7% by weight of $Ta_2O_5$ and/or up to <0.5% by weight of $Nb_2O_5$. Higher levels of $Nb_2O_5$ would increase the crystallization tendency of the glasses. In particularly preferred embodiments, the glasses are free from $Nb_2O_5$. At the above-mentioned levels, these components allow the optical status to be varied in particularly wide ranges with the same base glass composition. These components are in particular used in order to achieve medium Abbé numbers at particularly high refractive indices. Furthermore it is possible to achieve X-ray opacity in the glasses by using $Ta_2O_5$, just as by using $TiO_2$ or $ZrO_2$, at higher levels within the claimed range. The glasses preferably contain at least two percent by weight of a sum total of $TiO_2$+$ZrO_2$+$Ta_2O_5$. It is thus already possible to obtain X-ray-opaque glass bodies from these glasses. In order to achieve adequate X-ray opacity, even at low thickness of the glass bodies, the glasses should contain a total of at least 4.5 percent by weight of these components. A further increase of their content would, in certain combinations of the three components determining the optical status, lead to $n_d$ and $v_d$ deviations from the desired values and to an unnecessary increase in batch price owing to the uneccesarily high $Ta_2O_5$ levels. Furthermore, adequate potential X-ray opacity is already achieved with the claimed amounts.

It is therefore preferred that the sum total of $TiO_2$, $ZrO_2$ and $Ta_2O_5$ is no more than 15 percent by weight. Glasses having a $TiO_2$+$ZrO_2$+$Ta_2O_5$ content of between 2 and 15 percent by weight have refractive indices $n_d$ between 1.50 and 1.55 and Abbé numbers $v_d$ between 47 and 57.

For precise adjustment and thus to counterbalance the components adjusting the low Abbé numbers at the same time as high refractive indices, the glasses can contain up to 3 percent by weight of F. In addition, low amounts of F increase transmission by suppressing ilmenite formation (complex formation with $Fe^{III}$) and can have an additional fining effect, so that these glasses have significantly fewer bubble defects than comparable glasses containing no F.

In order to improve the glass quality, one or more fining agents known per se can be added to the batch in conventional amounts in order to refine the glass. The glass then has a particularly good internal quality with respect to freedom from bubbles and streaks.

If the fining agent used is not $As_2O_3$, but instead, for example, $Sb_2O_3$, which is possible without losses regarding the glass quality, the glasses, which are lead-free according to the invention, are in addition free from arsenic, except for trace arsenic oxide impurities. The $Sb_2O_3$ content is preferably between 0.1 and 0.5 percent by weight.

Within the above-mentioned composition range, there are various groups of particularly preferred composition ranges.

On the one hand, in particularly preferred embodiments the glass comprises (in % by weight, based on oxide): $SiO_2$<60–70, preferably 63–70; $Al_2O_3$, 0.3–<5; $Na_2O$, 16–25, preferably 19–24; $TiO_2$, 0 to 9; $ZrO_2$, 0–7; $Nb_2O_5$, 0–<0.5, but preferably $Nb_2O_5$-free; $Ta_2O_5$, 0–7, wherein a sum total of $TiO_2+ZrO_2+Nb_2O_5+Ta_2O_5$, 4.5–15, or preferably a sum of $TiO_2+ZrO_2+Ta_2O_5$, 4.5–15.

These glasses have refractive indices $n_d$ between 1.50 and 1.55 and Abbé numbers $v_d$ of between 50 and 57, and, with compositions from the preferred ranges given, refractive indices $n_d$ between 1.50 and 1.53 and Abbé numbers $v_d$ between 51 and 57. These glasses are X-ray-opaque.

On the other hand, the following glasses (in percent by weight, based on oxide) are particularly preferred, because they exhibit a particular optical position at the same time as high crystallization tendency: $SiO_2$<60–70, preferably 63–70; $Al_2O_3$, 3–<5; $Na_2O$, 16–25, preferably 19–24; $TiO_2$, 3–9; $ZrO_2$, 0.1–2; $Nb_2O_5$, 0<0.5, preferably 0–0.1; F, 0–3.

The relatively high $TiO_2$ content serves to adjust the refractive index.

The glasses have refractive indices n between 1.51 and 1.55 and Abbé numbers $v_d$ of between 47 and 54, and, with compositions from the preferred ranges, refractive indices $n_d$ between 1.52 and 1.55 and Abbé numbers $v_d$ between 47 and 53.

Especially preferred embodiments of the invention include glasses of the following composition (in percent by weight, based on oxide): $SiO_2$, 63–70; $Al_2O_3$, 114 <5; $Na_2O$, 19–24; $TiO_2$, 3–6; $ZrO_2$, 0.1–2; which have refractive indices $n_d$ between 1.51 and 1.54 and Abbé numbers $v_d$ between 50 and 53, and glasses of the following composition (in percent by weight, based on oxide): $SiO_2$, 63–70; $Al_2O_3$, 0.3–1; $Na_2O$, 19–24; $TiO_2$, 6–9; $ZrO_2$, 0.1–2; and F, 0.5–3; which have refractive indices $n_d$ between 1.52 and 1.55 and Abbé numbers $v_d$ between 47 and 50.

Both groups of glasses are $Nb_2O_5$-free and therefore have a particularly high crystallization stability. The former glasses containing more $Al_2O_3$ and less $TiO_2$ differ from the latter glasses containing less $Al_2O_3$, more $TiO_2$ and F by a significantly higher Abbé number with equally good melting behavior.

The glasses according to invention have the following advantages in addition to the desired optical properties:

The glasses are PbO-free and, in a preferred embodiment, also $As_2O_3$-free. The glasses have good crystallization stability. This enables production in a continuous melting unit. A measure of crystallization stability, which is adequate for a product of this type, is the viscosity at the upper devitrification limit. For continuous production, it should be $\geq 1000$ dPas. This is the case with the glasses according to the invention. Crystallization stability of the glasses also enables further thermal treatment of the glasses, such as pressing or re-pressing. A very good processing range is also ensured by the length of the glasses.

The glasses not only have good processing properties, but also good melting properties. This is also evident from their melting points of about 1330° C.

The glasses have excellent chemical resistance, evident from their classification in alkali resistance class AR 1 (ISO 10629) and in acid resistance class SR 1 (ISO 8424). These resistances in each case may be 1.x. The chemical resistance of the glasses is of importance for their further treatment, such as grinding and polishing.

EXAMPLE

Four examples of glasses according to the invention were produced from conventional raw materials.

Table II shows the respective compositions (in percent by weight, based on oxide), the refractive index $n_d$, the Abbé number $v_d$, the partial dispersion in the blue region of the spectrum $P_{g,F}$, and the anomaly of this partial dispersion, $\Delta P_{g,F}$ [$10^{-4}$], the density $\rho$ [g/cm$^3$], the coefficient of thermal expansion $\alpha_{20/300}$ [$10^{-6}$/K], and the glass transition temperature Tg [° C.] of the glasses.

The glasses according to the invention were produced as follows: the raw materials for the oxides, preferably carbonates, nitrates, were pre-mixed, the fining agent was added, and the components were then thoroughly mixed. The glass batch was melted in a batch melting unit at melting temperatures of between about 1300° C. and 1380° C., then fined and homogenized well. The casting temperature was about 1250° C.

Table I shows a melt example.

TABLE I

MELT EXAMPLE FOR 100 KG OF CALCULATED GLASS

| Oxide | % by weight | Raw material | Weight [kg] |
|---|---|---|---|
| $SiO_2$ | 69.8 | $SiO_2$ | 69.8 |
| $Al_2O_3$ | 2.0 | $Al(OH)_3$ | 3.1 |
| $Na_2O$ | 22.9 | $Na_2CO_3$ | 39.3 |
| $ZrO_2$ | 0.1 | $ZrO_2$ | 0.1 |
| $Nb_2O_5$ | 0.1 | $Nb_2O_5$ | 0.1 |
| $Ta_2O_5$ | 4.9 | $Ta_2O_3$ | 4.9 |
| $Sb_2O_3$ | 0.2 | $Sb_2O_3$ | 0.2 |
| Σ | 100.0 | | 117.5 |

TABLE II

GLASS COMPOSITIONS (in % by weight, based on oxide) AND ESSENTIAL PROPERTIES THEREOF

| | 1 | 2 | 3 | 4 |
|---|---|---|---|---|
| $SiO_2$ | 69.8 | 69.8 | 69.8 | 69.8 |
| $Al_2O_3$ | 2.0 | 0.5 | 2.0 | 2.0 |
| $Na_2O$ | 22.9 | 20.2 | 22.9 | 22.9 |
| $TiO_2$ | — | 7.8 | 4.9 | — |
| $ZrO_2$ | 0.1 | — | 0.1 | 5.0 |
| $Nb_2O_5$ | 0.1 | — | 0.1 | 0.1 |
| $Ta_2O_5$ | 4.9 | — | — | — |
| F | — | 1.5 | — | — |
| $Sb_2O_3$ | 0.2 | 0.2 | 0.2 | 0.2 |
| $n_d$ | 1.50844 | 1.53045 | 1.52515 | 1.51481 |
| $v_d$ | 56.42 | 49.06 | 51.42 | 56.04 |
| $P_{g,F}$ | 0.5472 | 0.5609 | 0.5556 | 0.5474 |
| $\Delta P_{g,F}$* | −17 | −3 | −17 | −21 |
| $\alpha_{20/300}$*' | 9.7 | 8.7 | 9.7 | 9.7 |
| Tg [° C.] | 437 | 467 | 444 | 422 |
| $\rho$, [g/cm$^3$] | 2.57 | 2.50 | 2.52 | 2.50 |

*multiply values for $\Delta P_{g,F}$ by $10^{-4}$;
*'units of $\alpha$ $10^{-6}$/K The disclosure in German Patent Application 101 33 521.0-46 of Jul. 10, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in lead-free optical glasses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A lead-free optical glass with an index of refraction ($n_d$) between 1.49 and 1.55 and an Abbé number ($v_d$) between 47 and 59, wherein said optical glass consists of, in percent by weight on an oxide basis:

| | |
|---|---|
| $SiO_2$ | 60 to 70 |
| $Al_2O_3$ | 0.3 to 5 |
| $Na_2O$ | 16 to 25 |
| $TiO_2$ | 0 to 9 |
| $ZrO_2$ | 0 to 7 |
| $Nb_2O_5$ | 0 to 0.4 |
| $Ta_2O_5$ | 0 to 7 |
| F | 0 to 3 | and optionally at least one fining agent in an amount sufficient for fining.

2. The lead-free optical glass as defined in claim 1, wherein said index of refraction ($n_d$) is between 1.50 and 1.55, said Abbé number ($v_d$) is between 47 and 57, and a sum of said $Ta_2O_5$+ said $ZrO_2$+ said $TiO_2$ is from 2 to 15 percent by weight on said oxide basis, and containing from greater than 60 to 70 percent by weight on said oxide basis of said $SiO_2$ and from 0.3 to less than 5 percent by weight on said oxide basis of said $Al_2O_3$.

3. The lead-free optical glass as defined in claim 1, wherein said index of refraction ($n_d$) is between 1.51 and 1.55, said Abbé number ($v_d$) is between 47 and 54, and containing from 0.3 to less than 5 percent by weight on said oxide basis of said $Al_2O_3$, from 3 to 9 percent by weight on said oxide basis of said $TiO_2$, from 0.1 to 2 percent by weight on said oxide basis of said $ZrO_2$, and not containing said $Ta_2O_5$.

4. The lead-free optical glass as defined in claim 1, wherein said index of refraction ($n_d$) is between 1.52 and 1.55, said Abbé number ($v_d$) is between 47 and 53, and containing from greater than 63 to 70 percent by weight on said oxide basis of said $SiO_2$, from 0.3 to less than 5 percent by weight on said oxide basis of said $Al_2O_3$, from 19 to 24 percent by weight on said oxide basis of said $Na_2O$, from 3 to 9 percent by weight on said oxide basis of said $TiO_2$, from 0.1 to 2 percent by weight on said oxide basis of said $ZrO_2$, from 0 to 0.1 percent by weight on said oxide basis of said $Nb_2O_5$, and not containing said $Ta_2O_5$.

5. The lead-free optical glass as defined in claim 1, wherein said index of refraction ($n_d$) is between 1.51 and 1.54, said Abbé number ($v_d$) is between 50 and 53, and containing from 63 to 70 percent by weight on said oxide basis of said $SiO_2$, from 1 to less than 5 percent by weight on said oxide basis of said $Al_2O_3$, from 19 to 24 percent by weight on said oxide basis of said $Na_2O$, from 3 to 6 percent by weight on said oxide basis of said $TiO_2$, from 0.1 to 2 percent by weight on said oxide basis of said $ZrO_2$, not containing said $Ta_2O_5$ and not containing said $Nb_2O_5$.

6. The lead-free optical glass as defined in claim 1, wherein said index of refraction ($n_d$) is between 1.52 and 1.55, said Abbé number ($v_d$) is between 47 and 50, and containing from 63 to 70 percent by weight on said oxide basis of said $SiO_2$, from 0.3 to 1 percent by weight on said oxide basis of said $Al_{2O3}$, from 19 to 24 percent by weight on said oxide basis of said $Na_2O$, from 3 to 9 percent by weight on said oxide basis of said $TiO_2$. from 0.1 to 2 percent by weight on said oxide basis of said $ZrO_2$, from 0.5 to 3 percent by weight on said oxide basis of said F, not containing said $Ta_2O_5$ and not containing said $Nb_2O_5$.

7. The lead-free optical glass as defined in claim 1, opaque to X-rays, having said index of refraction ($n_d$) between 1.50 and 1.55, having said Abbé number ($v_d$) between 50 and 57, containing from greater than 60 to 70 percent by weight on said oxide basis of said $SiO_2$, containing from 0.3 to less than 5 percent by weight on said oxide basis of said $Al_2O_3$, and not containing said $Nb_2O_5$, and wherein a sum of said $Ta_2O_5$+ said $Nb_2O_5$+ said $ZrO_2$+said $TiO_2$ is from 4.5 to 15 percent by weight on said oxide basis.

8. The lead-free optical glass as defined in claim 1, opaque to X-rays, having said index of refraction ($n_d$) between 1.50 and 1.53, having said Abbé number ($v_d$) between 51 and 57, containing from 63 to 70 percent by weight on said oxide basis of said $SiO_2$, containing from 0.3 to less than 5 percent by weight on said oxide basis of said $Al_2O_3$ and containing from 19 to 24 percent by weight on said oxide basis of said $Na_2O$, and wherein a sum of said $Ta_2O_5$+ said $ZrO_2$+ said $TiO_2$ is from 4.5 to 15 percent by weight on said oxide basis.

9. The lead-free optical glass as defined in claim 1, wherein said at least one fining agent is $Sb_2O_3$ and said $Sb_2O_3$ is present in an amount of from 0.1 to 0.5 percent by weight.

10. The lead-free optical glass as defined in claim 1, free of arsenic oxide, except for impurities comprising said arsenic oxide.

11. A lead-free optical glass having an index of refraction ($n_d$) between 1.52 and 1.55 and an Abbé number ($v_d$) between 47 and 50, wherein said lead-free optical glass consists of, in percent by weight on an oxide basis:

| | |
|---|---|
| $SiO_2$ | 63 to 70 |
| $Al_2O_3$ | 0.3 to 1 |
| $Na_2O$ | 19 to 24 |
| $TiO_2$ | 3 to 9 |
| $ZrO_2$ | 0.1 to 2 |
| F | 0.5 to 3 | and optionally at least one fining agent in an amount sufficient for fining.

* * * * *